(12) United States Patent
Takada

(10) Patent No.: US 8,096,710 B2
(45) Date of Patent: Jan. 17, 2012

(54) ROTOR FOR USE IN ROTARY ENCODER AND WHEEL ROLLING BEARING ASSEMBLY INCLUDING THE SAME

(75) Inventor: Yoshito Takada, Nara (JP)

(73) Assignee: JTEKT Corporation, Osaka-Shi (JP)

( * ) Notice: Subject to any disclaimer, the term of this patent is extended or adjusted under 35 U.S.C. 154(b) by 759 days.

(21) Appl. No.: 12/087,342

(22) PCT Filed: Jan. 19, 2007

(86) PCT No.: PCT/JP2007/050805
§ 371 (c)(1),
(2), (4) Date: Jul. 2, 2008

(87) PCT Pub. No.: WO2007/083750
PCT Pub. Date: Jul. 26, 2007

(65) Prior Publication Data
US 2009/0003744 A1    Jan. 1, 2009

(30) Foreign Application Priority Data
Jan. 23, 2006   (JP) .................................. 2006-013441

(51) Int. Cl.
*F16C 32/00* (2006.01)
*F16C 33/78* (2006.01)
*G01P 3/42* (2006.01)
(52) U.S. Cl. .......................... 384/448; 384/446; 324/173
(58) Field of Classification Search .................. 384/448, 384/477, 486, 484; 324/173, 174, 207.25
See application file for complete search history.

(56) References Cited

U.S. PATENT DOCUMENTS

| 4,948,277 | A | * | 8/1990 | Alff | 384/448 |
|---|---|---|---|---|---|
| 5,004,358 | A | * | 4/1991 | Varvello et al. | 384/446 |
| 5,431,413 | A |  | 7/1995 | Hajzler et al. |  |
| 5,611,545 | A | * | 3/1997 | Nicot | 384/448 |
| 5,947,611 | A | * | 9/1999 | Nagase | 384/448 |
| 5,969,518 | A | * | 10/1999 | Merklein et al. | 324/173 |
| 6,170,992 | B1 | * | 1/2001 | Angelo et al. | 384/486 |
| 6,682,076 | B1 | * | 1/2004 | Hosoda et al. | 384/448 |
| 7,034,521 | B2 | * | 4/2006 | Sentoku et al. | 324/174 |
| 7,350,976 | B2 | * | 4/2008 | Ohtsuki et al. | 384/489 |
| 2003/0059139 | A1 |  | 3/2003 | Nakajima |  |
| 2004/0258337 | A1 | * | 12/2004 | Norimatsu et al. | 384/448 |
| 2005/0116707 | A1 |  | 6/2005 | Matsumoto |  |

FOREIGN PATENT DOCUMENTS

| CN | 1409097 A | 4/2003 |
|---|---|---|
| JP | 2002-174258 A | 6/2002 |
| JP | 2003-75194 A | 3/2003 |
| JP | 2004-340979 A | 12/2004 |
| JP | 2004-354102 A | 12/2004 |
| JP | 2005-156498 A | 6/2005 |

* cited by examiner

*Primary Examiner* — Marcus Charles
(74) *Attorney, Agent, or Firm* — Birch, Stewart, Kolasch & Birch, LLP

(57) ABSTRACT

The invention seeks to provide a rotor for use in rotary encoder, which is increased in magnetic intensity and mechanical strength thereby achieving exact detection of rotation speed.
A corner portion formed between a cylindrical portion 21 and a mounting flange 22 of a core 20 constitutes a protrusion 23 unitized with the cylindrical portion and the mounting flange, protruded from axial one end of the cylindrical portion 21 and opened toward the axial other end thereof. A part of a pulser ring 31 is disposed in the protrusion 23.

2 Claims, 5 Drawing Sheets

FIG. 1

Background Art

ROTOR FOR USE IN ROTARY ENCODER AND WHEEL ROLLING BEARING ASSEMBLY INCLUDING THE SAME

TECHNICAL FIELD

The present invention relates to a rotor for use in rotary encoder and a wheel rolling bearing assembly including the same.

BACKGROUND ART

FIG. 5 is a sectional view showing a rotary encoder in a conventional wheel rolling bearing assembly. A wheel rolling bearing assembly 210 includes: an outer ring 210a fixed to a vehicle body via an unillustrated knuckle; an inner ring 210b fixed to an unillustrated axle shaft mounted with an unillustrated wheel; a plurality of balls 210c as a rolling element interposed between the outer ring 210a and the inner ring 210b; and a cage 210d formed with pocket portions at regular space intervals, the pocket portions receiving the balls 210c.

The rotary encoder for detecting the number of revolutions of the wheel rolling bearing assembly 210 includes: a rotor 220 fixed to the wheel rolling bearing assembly 210; and a rotation detection sensor S for magnetically detecting the rotation of the rotor 220.

The rotor 220 is formed from rubber admixed with magnetic powder, such as ferrite powder, and in an annular shape. The rotor includes: a magnetized portion 222 circumferentially magnetized in alternating S-polarity and N-polarity; and an annular core portion 221 supporting the magnetized portion 222.

The core portion 221 further includes: a cylindrical portion 221a press-fitted on an outer periphery of a shoulder 210e of the inner ring 210b; and a flange portion 221b extended radially outwardly from one axial end of the cylindrical portion 221a. The core portion 221 is formed in an L-shape in section.

The magnetized portion 222 is fixed to a lateral side of the flange 221b so as to oppose a detecting portion of the rotation detection sensor S in an axial direction.

When the rotor 220 so fixed to the inner ring 210b is rotated in conjunction with the rotation of the wheel, the polarities of the magnetized portion 222 opposite the rotation detection sensor S alternate with each other, so that the rotation detection sensor S outputs the changes of magnetic field as the number of revolutions of the wheel.

Patent Document 1: Japanese Unexamined Patent Publication No. 2003-75194

DISCLOSURE OF THE INVENTION

Problems to be Solved by the Invention

The aforementioned conventional rotor 220 has the following problems.

The rotor 220 is disposed in an annular space defined between the outer ring 210a and the inner ring 210b of the wheel rolling bearing assembly 210. Therefore, the magnetized portion 222 is limited in the radial dimension thereof so that the intensity of magnetic field produced by the magnetized portion 222 cannot be increased to above a certain level. The increase of detection sensitivity of the rotary encoder dictates the need to increase the sensitivity of the rotation detection sensor S. Unfortunately, however, a high-sensitivity sensor is so expensive that the cost reduction of the rotary encoder is impracticable.

The core portion 221 of the rotor 220 is formed in the simple L-shape in section. If the core portion is not formed in sufficient thickness, therefore, the flange 221b is prone to axial tilt. The axial tilt of the flange 221b leads to the variations of axial face-to-face distance between the magnetized portion 222 and the rotation detection sensor S. It is therefore difficult to provide an exact detection of the number of revolutions. On the other hand, the core portion 221 increased in the thickness involves a difficult press working and an increased manufacture cost results.

The invention has an object to provide a rotor for use in rotary encoder, which is adapted to produce a strong magnetic field without increasing the radial dimension of a pulser ring (magnetized portion) and to reduce the tilt of the flange by achieving a greater strength of the core without increasing the thickness thereof, thereby achieving the exact rotation speed detection, as well as to provide a wheel rolling bearing assembly using the same.

Means for Solving the Problems

In accordance with the invention, a rotor for use in rotary encoder comprising: a pulser ring magnetized in a manner that N polarity and S polarity appear alternately along a circumferential direction thereof, and a core for mounting the pulser ring to an outer periphery of a rotary shaft, the core including: a cylindrical portion fitted on the outer periphery of the rotary shaft, and a mounting flange extending radially outwardly from axial one end of the cylindrical portion, the mounting flange mounted with the pulser ring, the rotor is characterized in that a corner portion formed between the cylindrical portion and the mounting flange constitutes a protrusion unitized with the cylindrical portion and the mounting flange, protruded from the axial one end of the cylindrical portion and opened toward the axial other end thereof, and a part of the pulser ring is disposed in the protrusion.

This constitution permits the pulser ring limited in the radial length to attain a greater cross-sectional area than that of the conventional pulser ring. This leads to the construction of the rotor capable of producing a strong magnetic field.

The protrusion is so formed as to protrude from the axial one end of the cylindrical portion and to receive a part of the pulser ring therein. Therefore, the mounting flange is increased in rigidity at a proximal end thereof so that the axial tilt of the mounting flange may be reduced.

The above rotor may be used in, for example, the wheel rolling bearing assembly. In this case, the number of revolutions of the rotary shaft (wheel) may be detected if the rotor is mounted to the outer periphery of the inner ring constituting the rotary shaft and the magnetic sensor is disposed in opposing relation with the pulser ring of the rotor.

Effect of the Invention

The invention provides a rotor for use in rotary encoder, which is adapted to produce the strong magnetic field despite the small radial dimension of the pulser ring and to reduce the axial tilt of the mounting flange of the core in the axial direction of the rotary shaft, so as to achieve the exact detection of rotation speed.

BRIEF DESCRIPTION OF THE DRAWINGS

FIG. 1 is a vertical sectional view showing a wheel rolling bearing assembly;

DESCRIPTION OF REFERENCE CHARACTERS

Figure 2:
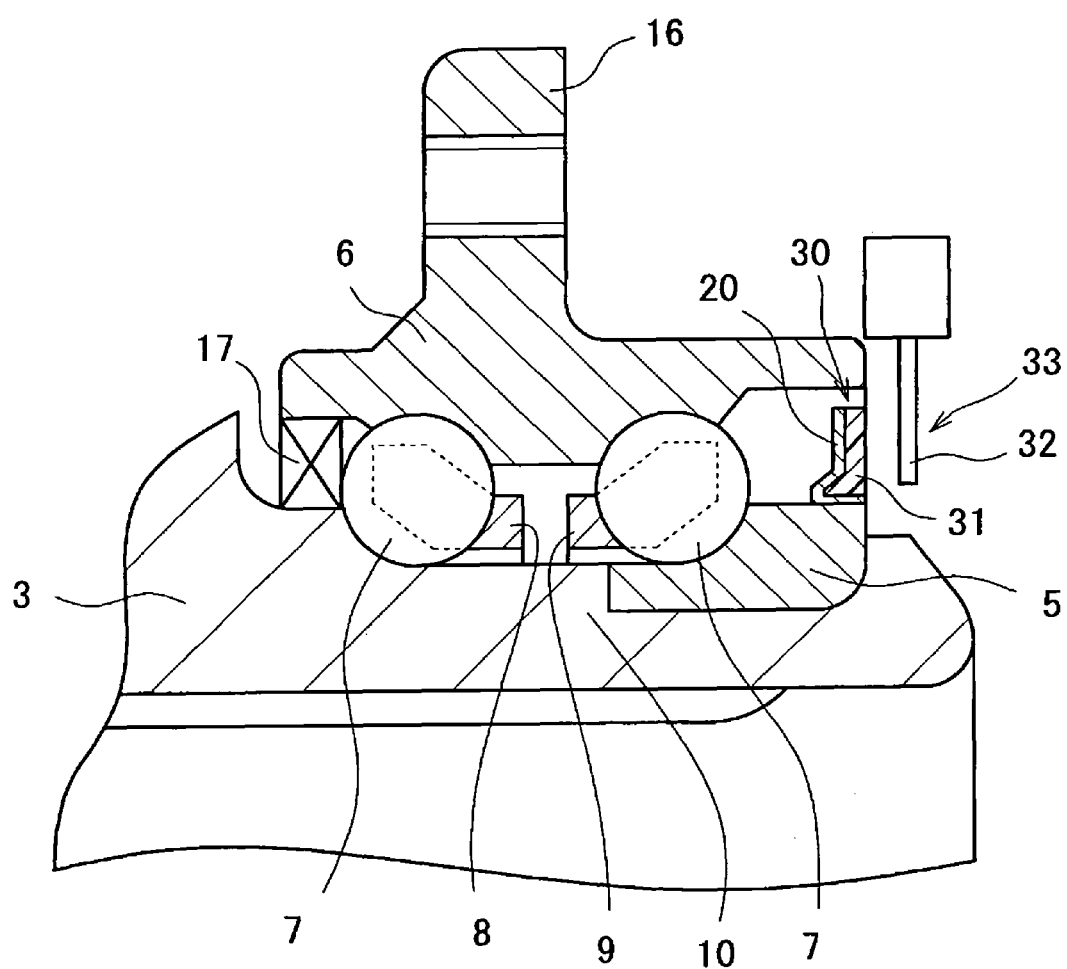
FIG. 2 is an enlarged view of an essential part of FIG. 1.

1: WHEEL ROLLING BEARING ASSEMBLY
2: FLANGED AXLE SHAFT
3: SHAFT BODY
4: FLANGE
5: INNER RING MEMBER
6: OUTER RING
7: ROLLING ELEMENT
10: INNER RING
20, 70: CORE
21, 71: CYLINDRICAL PORTION
22, 72: MOUNTING FLANGE
23, 73: PROTRUSION
24, 74: FIRST END PORTION (AXIAL ONE END)
25, 75: SECOND END PORTION (AXIAL OTHER END)
30, 80: ROTOR
31, 81: PULSER RING
32, 82: MAGNETIC SENSOR
33: ROTARY ENCODER

BEST MODES FOR CARRYING OUT THE INVENTION

The embodiment of the invention will hereinbelow be described with reference to the accompanying drawings.

Figure 1:
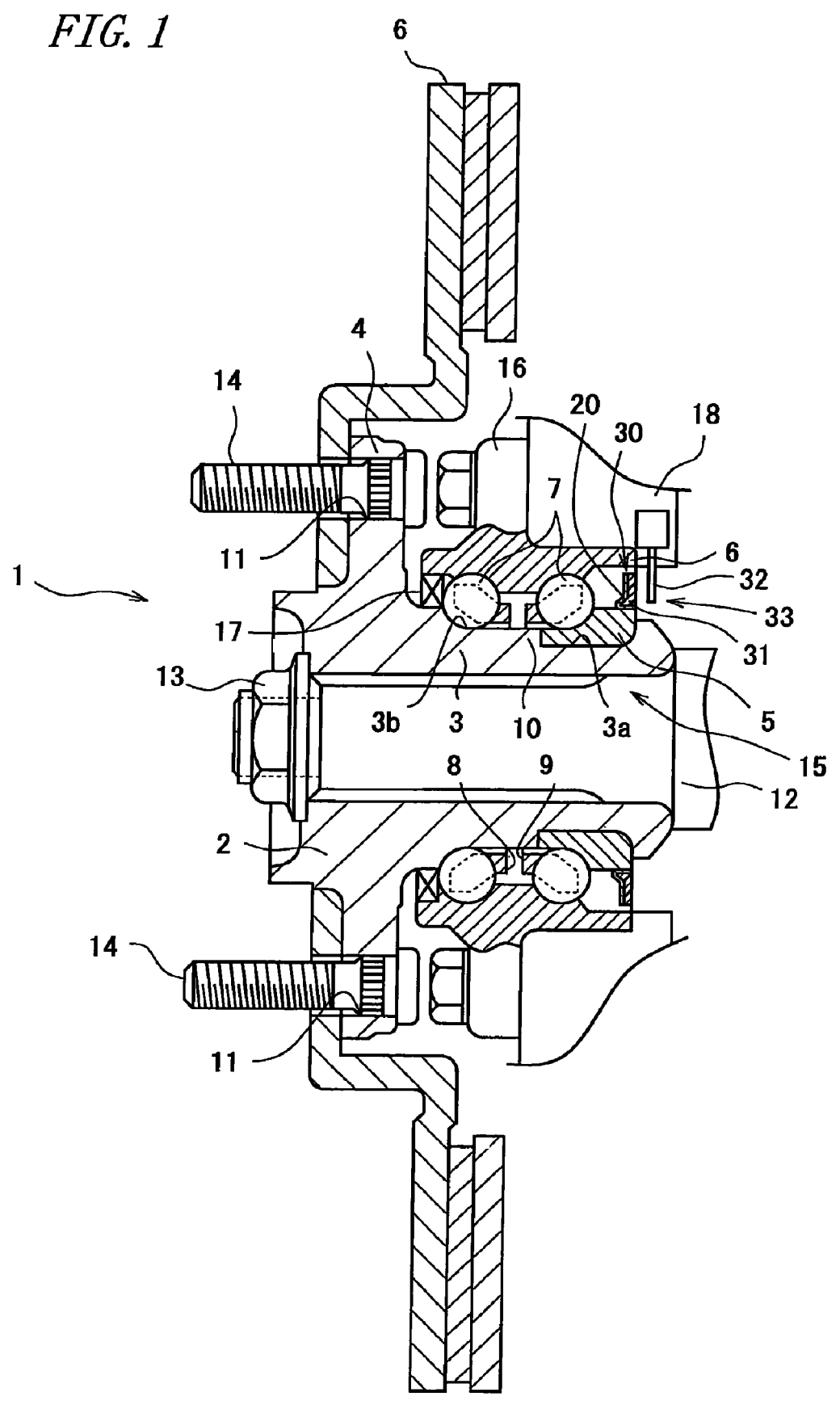

FIG. 1 is a vertical sectional view showing a wheel rolling bearing assembly 1. It is noted that the left-hand side as seen in FIG. 1 means a vehicular outer side whereas the right-hand side means a vehicular inner side. The same applies to FIG. 2 to FIG. 4.

The wheel rolling bearing assembly 1 has a basic construction as shown in FIG. 1. An shaft body 3 unitarily rotatable with a wheel is formed with a flange 4 at axial one end thereof, so that the shaft body 3 and the flange 4 jointly constitute a flanged axle shaft 2. The flange 4 is formed with through-holes 11 at circumferential places thereof. A brake disk rotor 6 is fixed to the flange 4 at a vehicular-outer side surface thereof by means of bolts 14 press-inserted through the through-holes 11.

An unillustrated wheel is fixed to a vehicular-outer side of the brake disk rotor 6 by means of the bolts 14. A drive shaft 12 is fitted in an inner periphery of the shaft body 3 so that the shaft body 3 and the drive shaft 12 are unitized by means of a nut 13.

A diametrically greater outside periphery 3b of the shaft body 3 defines a single inner raceway surface. An inner ring member 5 having a single inner raceway surface is fitted on a diametrically smaller outside periphery 3a of the shaft body 3. The shaft body 3 and the inner ring member 5 fitted on the shaft body 3 jointly constitute an inner ring 10 defining a rotary shaft. An outer periphery side of the inner ring 10 is embraced by a fixed side outer ring 6. The outer ring 6 includes double-row outer ring raceway surfaces in correspondence to the two rows of raceway surfaces of the inner ring 10.

The raceway surfaces of the inner ring 10, the raceway surfaces of the outer ring 6, rolling elements 7 arranged in double rows and two cages 8, 9 constitute a bearing portion 15 of the wheel rolling bearing assembly 1. The bearing portion 15 is a double-row angular contact ball bearing.

A fixing flange 16 projects radially outwardly from an outer periphery of the outer ring 6 so as to fix the outer ring to a knuckle 18 of a vehicle body. Further, a seal member 17 is interposed between a vehicular-outer end of the outer ring 6 and the flange 4. The seal member 17 prevents muddy water and such from invading into the bearing. Mounted to the knuckle 18 is a magnetic sensor 32 for detecting the changes of magnetic flux from a pulser ring (magnetized portion) 31 in the form of pulses.

FIG. 2 is an enlarged view of an essential part of FIG. 1. As shown in FIG. 2, the pulser ring 31 is mounted to a core 20 fitted on an outer periphery of the inner ring member 5, so as to be rotated unitarily with the inner ring 10 about an axis thereof.

The pulser ring 31 has an annular shape wherein S-polarity and N-polarity alternate with each other in a circumferential direction. The pulser ring 31 employs an elastic material, such as rubber, which is admixed with ferromagnetic powder such as ferrite powder. The core 20 is formed from steel and serves dual purposes of supporting the pulser ring 31 and mounting the pulser ring 31 to the inner ring member 5. The steel constituting the core 20 is magnetized such that the pulser ring may produce stronger magnetic field and magnetic flux.

A rotor 30 including the core 20 and the pulser ring 31, and the magnetic sensor 32 constitute a rotary encoder 33. As described above, the magnetic sensor 32 detects the changes of the magnetic flux from the pulser ring 31. Therefore, the pulser ring 31 may preferably have an increased volume to produce stronger magnetic field and magnetic flux. The increase or decrease of axial gap between the pulser ring 31 and the magnetic sensor 32 disables an exact detection of the number of revolutions of the pulser ring. Hence, the core 20 supporting the pulser ring 31 is required of higher strength.

Figure 3:
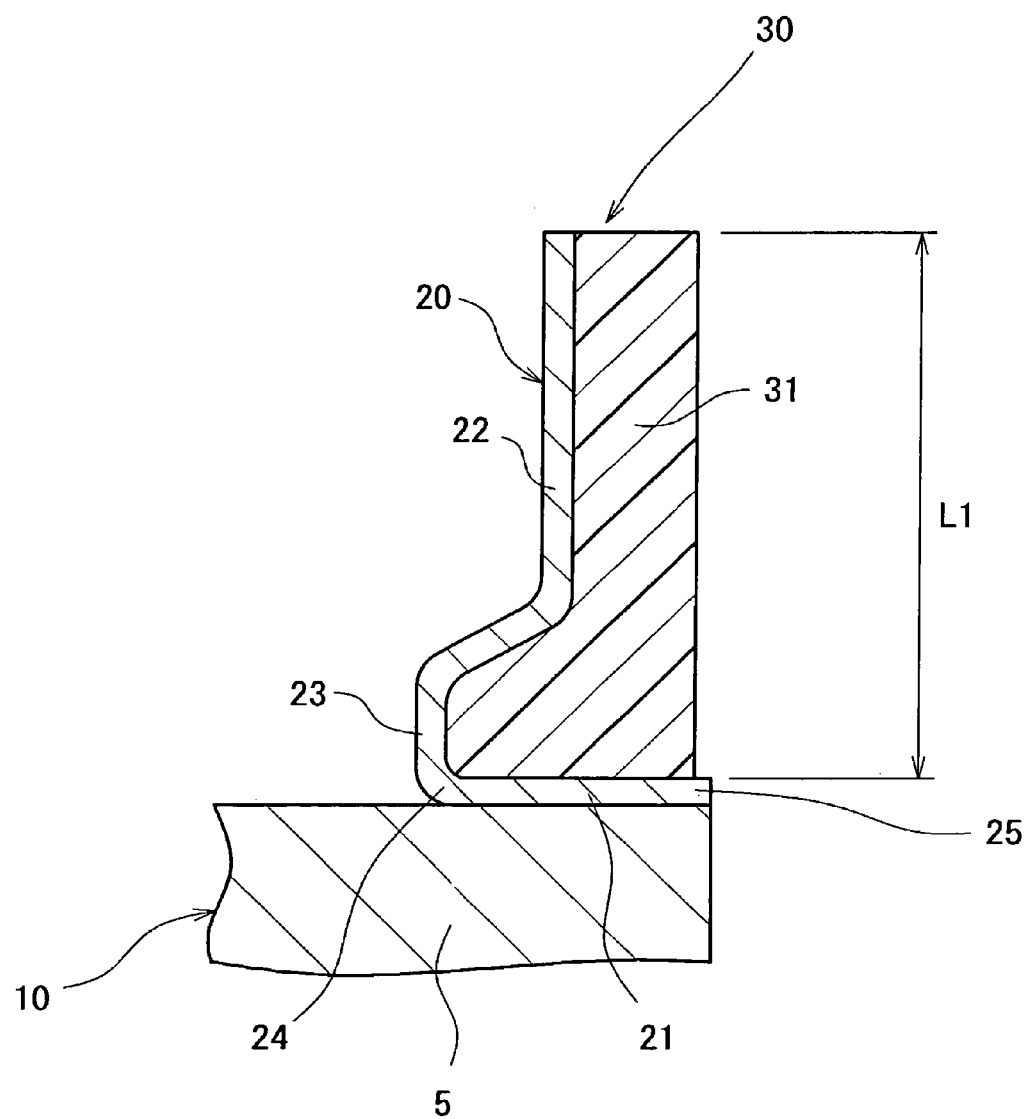
FIG. 3 is a sectional view showing a rotor according to a first embodiment of the invention.

FIG. 3 is a sectional view showing the rotor 30 according to a first embodiment of the invention. As viewed based on the bearing portion 15 (FIG. 1) of the rolling bearing assembly 1, a vehicular-outer side (the left-hand side) from the rotor 30 shown in FIG. 3 means an axially inner side, whereas a vehicular-inner side (the right-hand side) means an axially outer side.

The core 20 includes: a cylindrical portion 21 fitted on the inner ring member 5; and a mounting flange 22 extending radially outwardly from an axially inner end (vehicular-outer side) of the cylindrical portion 21. The pulser ring 31 is mounted to the mounting flange 22 at an axially outer side surface (vehicular-inner side) thereof.

The mounting flange 22 is described in greater details. It is noted here that the axially inner end of the cylindrical portion 21 will be referred to as a first end 24 and an axially outer end will be referred to as a second end 25. The mounting flange 22 extends halfway from the first end 24 of the cylindrical portion 21 in a radially outward direction, bends back axially outwardly at an acute angle to a radially outward phantom line, and then extends radially outwardly. A curved protrusion 23 opening toward the second end 25 is constituted by the bent portion of the mounting flange 22 and a part of the cylindrical portion 21. Specifically, the protrusion 23 is provided at a corner portion between the cylindrical portion 21 and the mounting flange 22, protruded to the opposite side (from the first end 24 of the cylindrical portion 21) from the second end 25 of the cylindrical portion 21, and is opened toward the second end 25 thereof. A part of the pulser ring 31 is received by the overall inner space (opening side) of the protrusion 23.

Figure 4:
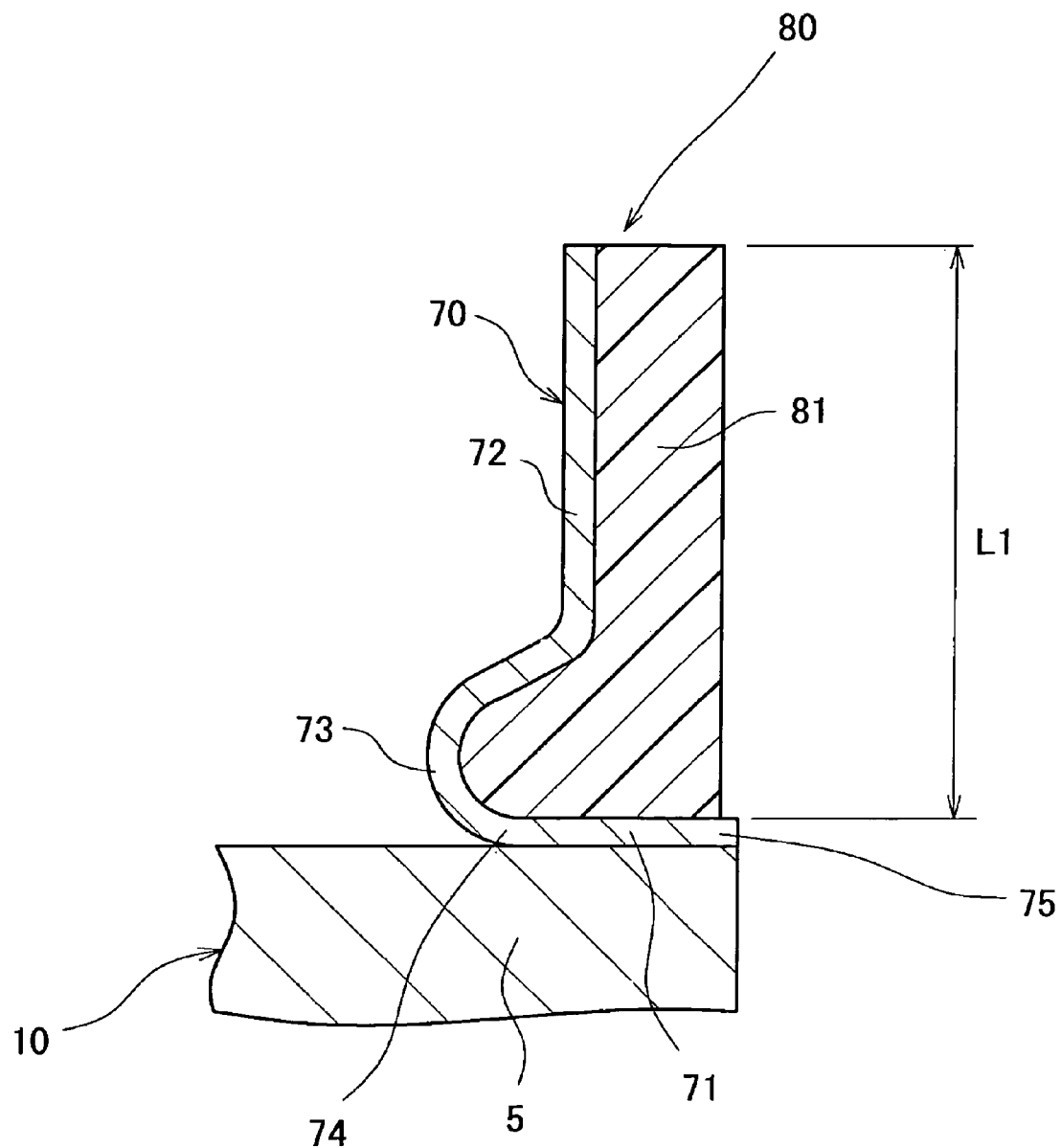
FIG. 4 is a sectional view showing a rotor according to a second embodiment of the invention.
Figure 5:
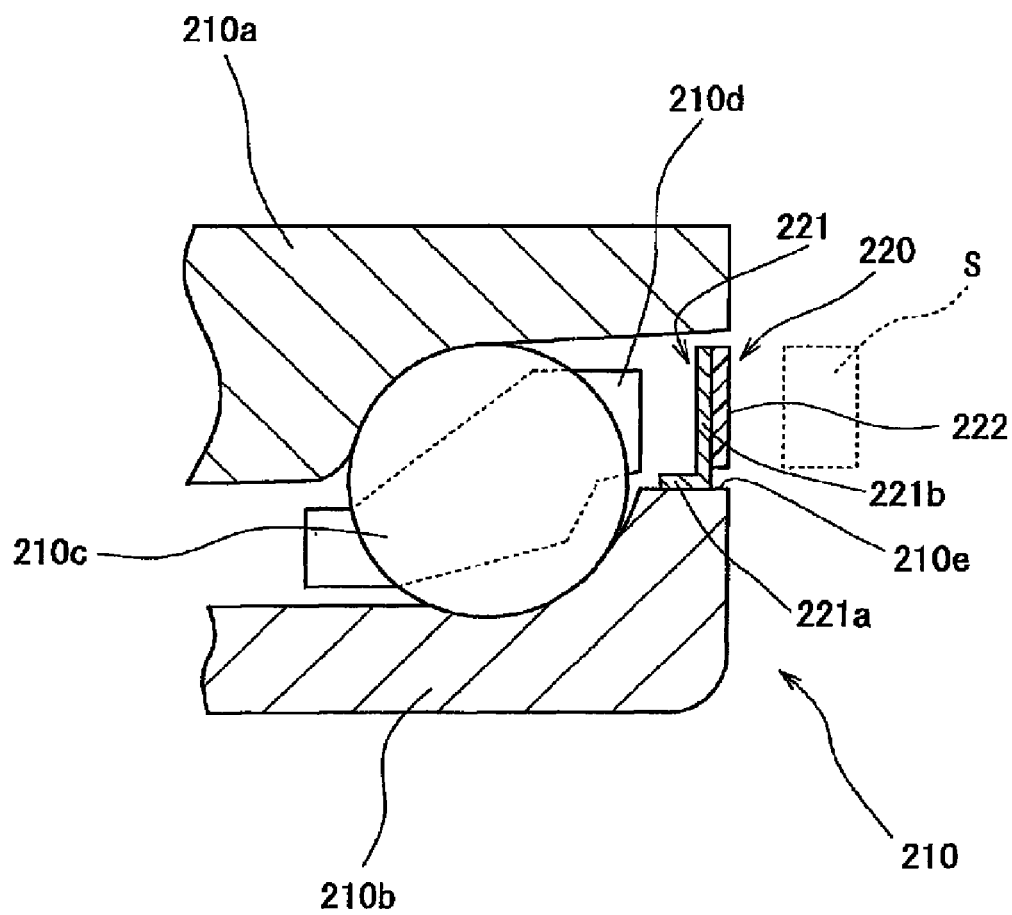
FIG. 5 is a sectional view showing a conventional rotor.

FIG. 4 is a sectional view showing a rotor 80 according to a second embodiment of the invention.

In this embodiment, as well, a core 70 includes: a cylindrical portion 71 fitted on the inner ring member 5; and a mounting flange 72 extending radially outwardly from an axially inner end (the left-hand side in FIG. 4; the vehicular-outer side) of the cylindrical portion 71. A pulser ring 81 is mounted to the mounting flange 72 at an axially outer side surface (the right-hand side in FIG. 4; the vehicular-inner side) thereof.

According to the second embodiment, a protrusion 73 is defined by a curved surface having an elliptical section. Specifically, a radially inner portion of the mounting flange 72 is defined by a curved surface having a semi-elliptic section, which extends somewhat from a vehicular-outer end (a first end) 74 of the cylindrical portion 71 in an axially inward direction of the inner ring 5 along a curved line and further extends axially outwardly from some midpoint. According the second embodiment, as well, the protrusion 73 protrudes to the opposite side from a second end 75 of the cylindrical portion 71 and is opened toward the second end 75. A part of the pulser ring 81 is received by the overall inner space (opening side) of the protrusion 73.

According to the first and second embodiments, the pulser ring 31, 81 may be formed not only from a mixture of an elastic material (elastomer), such as rubber, and ferrite powder, but also from a mixture of a synthetic resin (plastomer) and magnetic powder, such as ferrite powder.

A so-called cure adhesion method may be used for mounting the pulser ring 31, 81 to the core 20, 70. In this method, the pulser ring 31, 81 is previously formed to have a sectional shape conforming to the shape of the core 20, 70. The pulser ring 31, 81 is temporarily fixed to the core 20, 70 by means of an adhesive. Subsequently, the adhesive is heated so that the pulser ring is completely secured to the core.

In a case where the synthetic resin is used instead of the rubber, the pulser ring may be insert molded by setting the core 20, 70 in a mold, followed by filling the mixture of synthetic resin and magnetic powder in the mold.

As described above, the protrusion 23, 73 is provided at the corner portion formed between the cylindrical portion 21, 71 and the mounting flange 22, 72 such that the pulser ring 31, 81 may be partially received in the protrusion 23, 73. Therefore, the pulser ring 31, 81 may be increased in volume despite a small radial dimension thereof. Thus is constructed the rotor 30, 80 capable of producing the strong magnetic field and magnetic flux.

The protrusion 23, 73 is distended, while the pulser ring 31, 81 is disposed in a manner that a part thereof fills up the overall inner space of the protrusion 23, 73. Hence, the rotor 30, 80 is increased in axial thickness at a proximal end portion thereof (a radially inner portion at which the rotor is mounted to the inner ring) so that the proximal end portion of the rotor 30, 80 is increased in rigidity. If an external force is applied to the mounting flange 22, 72 when the rotor 30, 80 is mounted to the inner ring, for example, the axial tilt of the mounting flange 22, 72 may be reduced.

Namely, the rotor 30, 80 may be increased in magnetic intensity and mechanical strength.

The invention is not limited to the foregoing embodiments and may also be practiced in other modifications and exemplary application modes.

For instance, the configuration of the protrusion may include any other curved surface such as of parabola. In this case, the section of the protrusion may not be defined by a so-called curved surface but may be defined by a polygonal surface including many bent portions. For instance, the section of the protrusion may be defined by a general square U-shape including plural right angles (the whole body of the core having a semi-anastatic sectional shape).

Further, the mounting flange may be provided with plural protrusions so that the whole body of the core may have a Σ-shaped section (capital sigma).

It is apparent that the rotor 30 may be used with bearings of other modes such as deep groove ball bearings and tapered roller bearings and may be used with not the wheel rolling bearing assembly 1 but other rolling bearing assemblies such as for machine tools.

The invention claimed is:

1. A rotor for use in a rotary encoder comprising:
a pulser ring magnetized in a manner that N-polarity and S-polarity appear alternately along a circumferential direction thereof; and
a core for mounting the pulser ring to an outer periphery of a rotary shaft, the core including:
   a cylindrical portion fitted on the outer periphery of the rotary shaft; and
   a mounting flange extending radially outwardly from one axial end of the cylindrical portion, the mounting flange being mounted with the pulser ring,
   wherein a corner portion formed between the cylindrical portion and the mounting flange constitutes a protrusion unitized with the cylindrical portion and the mounting flange, protruded from the one axial end of the cylindrical portion and opened toward the other axial end thereof, and a part of the pulser ring is disposed in the protrusion.

2. A wheel rolling bearing assembly comprising:
an inner ring defining a rotary shaft;
a fixed outer ring embracing an outer periphery of the inner ring;
a rolling element rollably interposed between the inner ring and the fixed outer ring;
the rotor according to claim 1 mounted to the outer periphery of the rotary shaft; and
a magnetic sensor disposed in opposing relation with the pulser ring of the rotor for detecting the changes of magnetic flux in the form of pulses.

\* \* \* \* \*